Patented Sept. 24, 1946

2,408,311

UNITED STATES PATENT OFFICE 2,408,311

REMOVAL OF SULPHUR IN RECOVERY OF NICKEL

Robert C. Hills and Maurice F. Dufour, New York, N. Y., assignors to Nicaro Nickel Company, New York, N. Y., a corporation of Delaware No Drawing. Application February 16, 1943, Serial No. 476,063

7 Claims. (Cl. 23—61)

This invention relates to the elimination of sulphur impurities during the recovery of metal from ores, and more particularly, to the removal of sulphur during the recovery of nickel from product liquors obtained by leaching reduced nickeliferous ores with ammonium carbonate solutions.

It has heretofore been suggested that the nickel content of nickeliferous silicate and oxide ores and also sulphide ores (after first roasting to the oxide), be separated from such ores by subjecting the same to the action of reducing gases at high temperatures, then separating the reduced nickel from the ore after it is cooled by leaching and aerating the same with an ammonium carbonate solution containing preferably an addition of ammonium hydroxide, next precipitating nickel carbonate from the product liquor wherein the nickel in contained in the form of nickel-ammonium-carbonate complexes by distilling off the volatile ammonia content or by other means, then separating the basic nickel carbonate precipitate from the remaining product liquor, and finally repeatedly washing the precipitate with water and filtering (5 to 6 or more times) to remove as much of the sulphur impurities contained in such precipitate as is practical.

In the preparation of industrial quantities of the ore for the leaching operation in the above described process, the presence of sulphur impurities is virtually unavoidable. When sulphide ores are treated, the roasting treatment prior to the reduction treatment, although converting most of the sulphide to oxide, unavoidably leaves some sulphur present in the sulphate state or other form. When ores initially free of sulphur, such as limonite and serpentine, are treated, sulphur impurities are unavoidably introduced into the reduced ore either from the reducing gases derived by the incomplete combustion of the coal used or from the heating gases used to supplement the reducing gases and derived by the burning of fuel oil, which fuels ordinarily contain sulphur compounds. Because of these several sources of sulphur impurities, the quantity of sulphur impurities taken up in the leached liquors varies to a considerable extent and may be somewhat less that 1% or substantially more than 10%, based upon the nickel content of the leached solution.

In the process hereinbefore outlined, the repeated washing and filtration steps applied to the voluminous precipitate of basic nickel carbonate to reduce the sulphur impurities contained therein proved to be unsatisfactory due to the time consumed or the large amount of expensive equipment required, to the insufficiently complete removal of sulphur, and, of particular importance, to the loss of nickel in the several wash solutions. The difficulty from a mechanical standpoint alone of washing the precipitated mass is evident from the fact that the filter cake frequently retains as much as 75% water.

Various attempts have heretofore been made to simplify this operation without satisfactory results. Countercurrent washing or decantation washing is practically impossible because of the extremely poor settling characteristics of the precipitate. The addition of sodium carbonate wash water in which the filter cake is repulped effects a slight improvement in the rate of sulphur removal, but this rate is insufficient to avoid a large number of pulpings and filtrations if the sulphur impurities are to be removed to a satisfactory degree, i. e., down to about 0.10% or less based on the nickel present.

A primary object of the present invention is to remove sulphur impurities or the excess amount of such impurities from the recovered nickel compounds so that the large number of washing and filtration treatments heretofore employed may be eliminated or substantially reduced in number and an economically feasible process provided. A secondary important object is to prevent the waste of nickel heretofore lost through the repeated washing of the precipitated basic nickel carbonate. The ultimate object is the elimination of a sufficient proportion of the sulphur impurities from the nickel carbonate precipitate such that the subsequent refining steps capable of eliminating small amounts of sulphur will lead to metallic nickel free of sulphur.

According to one embodiment of the present invention, the sulphur impurities are removed by adding a small quantity of an alkali metal carbonate, preferably sodium carbonate, to the product liquor obtained by leaching a reduced nickeliferous ore with any of the known ammonium carbonate leaching solutions before the said liquor is treated for precipitating the basic nickel carbonate therefrom, and then filtering or otherwise separating the nickel carbonate precipitate from the remaining liquor containing at least a portion of the sulphur impurities rendered soluble or dissolved in the liquor solution. Thereafter, the precipitate may be relieved of an additional proportion of sulphur impurities by washing with water in a single repulping and filtration step. If the amount of sulphur in the initial liquor is not too large, the sulphur content may be thereby reduced to a negligible quantity.

Broadly considered, the present invention may be said to relate to a process whereby sulphur impurities are substantially eliminated in the recovery of metals from ammonium carbonate product leach liquors containing sulphur impurities and to involve the steps of rendering said sulphur impurities soluble in said leach liquor, and thereafter precipitating and separating the metal carbonate from the remaining liquor containing the dissolved sulphur impurities. The process is applicable in general to those reduced ores from which the metal content may be leached by treatment with ammonium carbonate leaching solutions accompanied by aeration, that is, to reduced ores containing, for example, nickel, cobalt, copper, or mixtures of the same. The mechanism by which the sulphur impurities are caused to be in a soluble state in the remaining liquor is not understood. The affinity of the metal carbonate for the sulphur impurities is destroyed by some undetermined chemical or physical action.

The process above described involving the addition of alkali metal carbonate to the product leach liquor and washing once with water is satisfactory particularly for the treatment of liquors containing a low percentage of sulphur. Where larger percentages of sulphur are present, larger quantities of alkali metal carbonate may be added to the product liquor with acceptable results, but when such liquors contain more than a small per cent of sulphur, more effective removal can be obtained by adding an amount of sodium carbonate to the product leach liquor sufficient only to solubilize or maintain dissolved a part of the sulphur impurities, and then after the nickel carbonate has been precipitated and prior to washing with water, washing with an additional quantity of sodium carbonate in aqueous solution. This procedure constitutes a second and important embodiment of the invention.

When the sulphur content of the product liquor based on the metal content is less than 5%, the amount of sodium carbonate in the product liquor is at a concentration preferably of about 0.25%. When the sulphur content is from 5 to 10%, the concentration of sodium carbonate is preferably at about 0.50%. When the sulphur content is above 10%, the concentration of sodium carbonate is preferably at about 1%. In large scale operations, the amounts of sodium carbonate required are somewhat less as a general rule. Increases in the amount of sodium carbonate in the product liquors give better results than increases in the amount employed in the washing step.

Where product liquors have a sulphur content of 10% or less, the addition of 0.5% sodium carbonate to the product liquor prior to the precipitation step reduces the amount of sulphur retained in the filter cake to 20-30% as compared with the amount retained if the product is precipitated without the addition of sodium carbonate. Although the addition of a greater quantity of sodium carbonate to the product liquor will reduce still further the quantity of sulphur retained in the filter cake, it is more economical to employ the above mentioned second embodiment, that is, to wash the filter cake on the filter with a solution of sodium carbonate or other compound hereinafter disclosed. Washing with a volume of 0.5% to 1.0% sodium carbonate solution equivalent to half the volume of the product liquor, reduces the sulphur content of the precipitate to 20-30% of the amount which would have been left had only water been used for the washing operation.

Although sodium carbonate is the preferred agent for removing sulphur impurities in accordance with the present invention, other agents may be used which have, like sodium carbonate, the property of destroying the affinity of the nickel compounds for the sulphur impurities, as sulphates and sulphites. These agents, of course, must be inert with respect to the metal-ammonium carbonate complexes in the product liquor and in the wash solution, or must not decompose and react with the carbonate complexes to form insoluble carbonates. Compounds of the alkali metals and preferably of sodium and potassium as the carbonates and hydroxides, are most satisfactory. In the washing operation, the weakly alkaline compounds serve to desorb the sulphur compounds in the precipitated metal carbonate.

In accordance with a limited embodiment of the present invention, heat is employed to assist the action of the sodium carbonate or other agent in removing the sulphur impurities. It has been found that heat assists the removal of sulphur both in the initial filtration of the precipitated metal compounds and in the washing of the precipitate or filter cake with the sodium carbonate or other washing solution. Although the solutions may be processed at any elevated temperature below that at which the metal compounds decompose, quite satisfactory results may be obtained at temperatures within the range of 150°–180° F. When the precipitation of the metal carbonate is effected by distilling off the ammonia content from the product liquor, the filtration of such precipitate may be conveniently and quite effectively carried out at the relatively high temperature of 180° F. or higher. The washing of the precipitate with the sodium carbonate solution may be economically and advantageously carried out at a temperature of about 150° F. The following table illustrates the effectiveness of hot washing solutions:

| Sample No. | Washed with 0.5L [1] of 0.5% $Na_2CO_3$ at— | |
|---|---|---|
| | 80° F. | 150° F. |
| 1 | .145% S on Ni basis | .07% S on Ni basis. |
| 2 | .092% S on Ni basis | .032% S on Ni basis. |
| 3 | 1.04% S on Ni basis | .42% S on Ni basis. |

[1] L is volume of product liquor. Ex: 0.5L=50% of the volume of product liquor used for washing the precipitate.

In the following table the results of the various embodiments of the process of the present invention are compared with each other and with processes not employing sodium carbonate additions:

| | Method of washing on filter | Per cent sulphur on metal basis | | |
|---|---|---|---|---|
| | | In prod. liq. | In precipitate containing metal no $Na_2CO_3$ added to prod. liq. | In precipitate containing metal 0.5% $Na_2CO_3$ added to prod. liq. |
| 1 | None | 8.54 | 7.22 | 2.14 |
| 2 | Washed with 0.5L $H_2O$ at 70° F | 8.54 | 4.56 | 0.44 |
| 3 | Washed with 0.5L of 0.5% $Na_2CO_3$ at 70° F | 8.54 | 1.48 | 0.17 |
| 4 | Washed with 0.5L of 0.5% NaOH at 175° F | 8.54 | 0.17 | 0.02 |
| 5 | None | 2.29 | 1.26 | 0.28 |
| 6 | Washed with 0.5L $H_2O$ at 70° F | 2.29 | 1.16 | 0.13 |
| 7 | None | 1.00 | 0.66 | 0.17 |
| 8 | Washed with 0.5L $H_2O$ at 70° F | 1.00 | 0.49 | 0.062 |
| 9 | Washed with 0.5L of 1.0% $Na_2CO_3$ at 70° F | 1.00 | 0.048 | 0.018 |

The product liquors treated in the respective runs were obtained by reducing lateritic nickeliferous ore with reducing and heating gases containing sulphur impurities and by leaching the reduced ores with ammoniacal solutions of ammonius carbonate (6% ammonia). In this table it will be noted that product liquors of several percentages of sulphur impurities are treated and that washing solutions of varying content of alkali are used at two different temperatures.

In a specific embodiment, the invention may be considered to involve adding to a product liquor obtained by leaching and serating a reduced nickeliferous lateritic ore an amount of sodium carbonate sufficient to give a concentration in the liquor of 0.25% to 0.5% depending upon the sulphur content in the product liquor, next distilling ammonia from the said treated product liquor thereby precipitating basic nickel carbonate, then filtering out said precipitate on a rotary vacuum filter while the liquor is at a temperature of about 180° F., and washing the filter cake first with a volume of 0.5% sodium carbonate solution equivalent to $\frac{1}{10}$ the volume of the product liquor and then with water in an amount equivalent to $\frac{1}{4}$ of the product liquor, the said sodium carbonate solution and water being used at a temperature of 150° F. or somewhat higher. Treatment in this manner reduces the sulphur impurity content in the nickel carbonate filter cake to 0.1% on the basis of the metal present.

If the product leach liquor contains iron impurities, the iron is removed before the addition of the sodium carbonate. The iron may be separated by precipitating the same through aeration of the product liquor and filtering out the precipitated iron, and if this procedure is used, the sodium carbonate may be added to the erators in which the iron is precipitated.

It should be understood that the present invention is not limited to the specific compounds and procedures hereinbefore discussed but that it extends to all other compounds and procedures which will occur to those skilled in the art upon consideration of the terms and scope of the claims appended hereto.

We claim:

1. In a process for obtaining precipitated nickel compounds in a condition substantially free of sulphur impurities from ammonium carbonate leach liquors containing nickel compounds dissolved therein and sulphur impurities, a substantial amount of the sulphur of which unites with the nickel in a water-insoluble form on expelling ammonia from the solution, the steps which comprise adding to said product leach liquor a soluble alkali metal compound, heating the resulting mixture until the nickel content is precipitated and separating substantially sulphur free nickel compounds thus precipitated from the solution containing sulphur impurities.

2. A process for obtaining precipitated nickel compounds in a condition substantially free of sulphur impurities from ammonium carbonate leach liquors containing nickel compounds dissolved therein and sulphur impurities, a substantial amount of the sulphur of which unites with the nickel in a water-insoluble form on expelling ammonia from the solution which comprises, adding to said product leach liquor an alkali metal compound selected from the group consisting of carbonates and hydroxides, heating the resulting mixture until the nickel content is precipitated and separating the substantially sulphur free precipitated nickel compounds obtained from the solution containing the solubilized sulphur impurities.

3. A process for obtaining precipitated nickel compounds in a condition substantially free of sulphur impurities from ammonium carbonate leach liquors containing nickel compounds dissolved therein and sulphur impurities, a substantial amount of the sulphur of which unites with the nickel in a water-insoluble form on expelling ammonia from the solution which comprises, adding sodium carbonate to said product leach liquor, heating the resulting mixture until the nickel content is precipitated and separating the substantially sulphur free precipitated nickel compounds from the solution containing sulphur impurities.

4. A process for obtaining precipitated nickel compounds in a condition substantially free of sulphur impurities from ammonium carbonate leach liquors containing nickel compounds dissolved therein and sulphur impurities, a substantial amount of the sulphur of which unites with the nickel in a water-insoluble form on expelling ammonia from the solution which comprises, adding to said product leach liquor a soluble alkali metal compound, heating the resulting mixture until the nickel content is precipitated, separating the solution containing part of the sulphur impurities from the precipitated nickel compounds containing the remaining part of the sulphur impurities therein and removing the remaining sulphur impurities by washing with a weakly alkaline solution, the amounts of alkali metal compound and alkaline solution used in the respective treatments each being sufficient to solubilize and prevent adsorption of substantial proportions of the sulphur impurities and the total amounts being sufficient to produce substantially sulphur free nickel compounds.

5. A process for obtaining precipitated nickel compounds in a condition substantially free of sulphur impurities from ammonium carbonate leach liquors containing nickel compounds dissolved therein and sulphur impurities, a substantial amount of the sulphur of which unites with the nickel in a water-insoluble form on expelling ammonia from the solution which comprises, adding to said product leach liquor an alkali metal compound selected from the group consisting of carbonates and hydroxides in a quantity sufficient to solubilize and prevent adsorption of a substantial portion of the sulphur impurities in the nickel precipitate to be formed, heating the resulting mixture until the nickel content is precipitated, separating the solution containing a part of the sulphur impurities from the precipitated nickel compounds containing the remaining but substantial part of the sulphur impurities and washing with a weakly alkaline solution of an alkali metal compound in a quantity sufficient to solubilize and remove the remaining sulphur impurities.

6. A process for obtaining precipitated nickel compounds in a condition substantially free of sulphur impurities from ammonium carbonate leach liquors containing nickel compounds dissolved therein and sulphur impurities, a substantial amount of the sulphur of which unites with the nickel in a water-insoluble form on expelling ammonia from the solution which comprises, adding to said product leach liquor a soluble alkali metal carbonate in a quantity sufficient to solubilize and prevent adsorption of a substantial portion of the sulphur impurities in the nickel precipitate to be formed, distilling off ammonia thereby precipitating basic nickel carbonate, filtering the resulting mass while hot thereby separating the remaining solution containing a part of the sulphur impurities and washing said precipitate with a heated weakly alkaline solution of an alkali metal compound in a quantity sufficient to solubilize and remove the substantial portion of sulphur impurities remaining in the precipitate.

7. A process for obtaining basic nickel carbonate in a condition substantially free of sulphur impurities from ammonium carbonate leach liquors containing nickel compounds dissolved therein and sulphur impurities, a substantial amount of the sulphur of which unites with the nickel in a water-insoluble form on expelling ammonia from the solution which comprises, adding sodium carbonate to said product leach liquor in a quantity sufficient to solubilize and prevent adsorption of a substantial portion of the sulphur impurities in the nickel precipitate to be formed, distilling off the ammonia thereby precipitating basic nickel carbonate, filtering the resulting mass thereby separating from the precipitated basic nickel carbonate the remaining solution containing a substantial part of the sulphur impurities and thereafter washing said precipitate with a dilute solution of sodium carbonate in a quantity sufficient to solubilize and remove the substantial portion of sulphur impurities remaining in the precipitate.

ROBERT C. HILLS.
MAURICE F. DUFOUR.